UNITED STATES PATENT OFFICE.

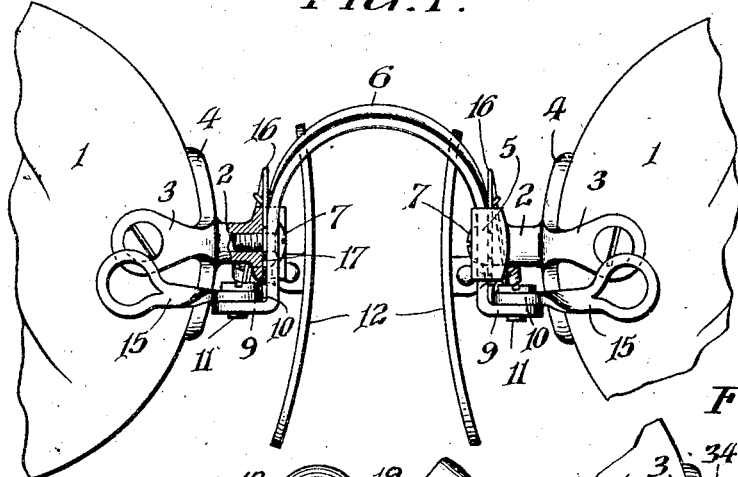
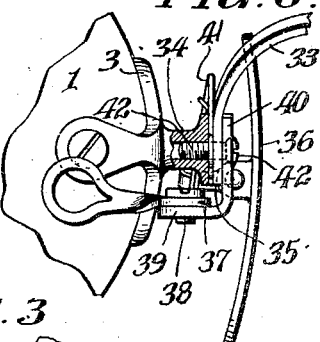
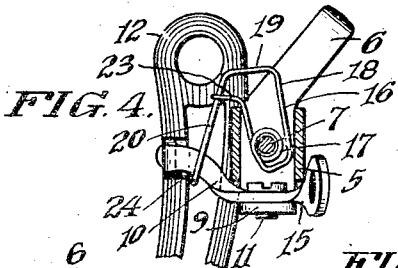
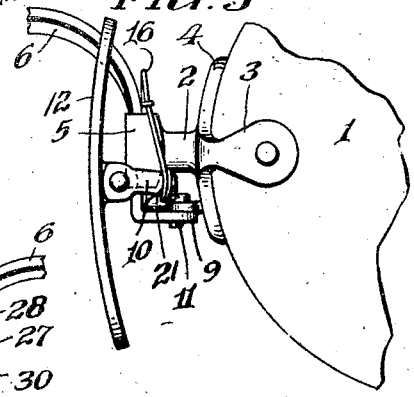
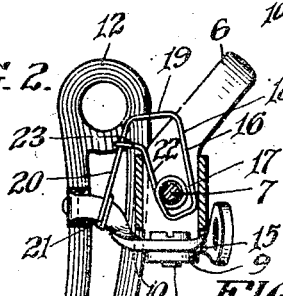
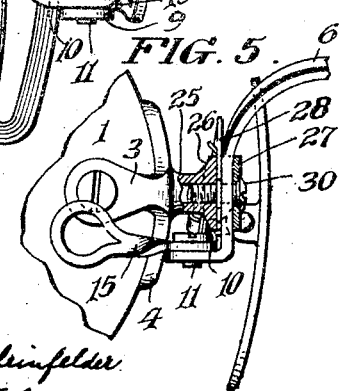

DANIEL V. BROWN, OF PHILADELPHIA, PENNSYLVANIA.

EYEGLASS-MOUNTING.

1,014,205.		Specification of Letters Patent.		Patented Jan. 9, 1912.

Application filed November 2, 1910. Serial No. 590,349.

*To all whom it may concern:*

Be it known that I, DANIEL V. BROWN, a citizen of the United States, residing in the city and county of Philadelphia, State of Pennsylvania, have invented certain new and useful Improvements in Eyeglass-Mountings, of which the following is a specification.

My invention relates to improvements in eyeglass mountings.

The object of my invention is to provide means including spring actuated nose bearing pieces or guards which are adapted to be employed in connection with the posts or studs of a pair of eyeglasses to which posts or studs is secured the means for connecting together the lenses of a pair of eyeglasses.

Heretofore as far as I am aware eyeglass mountings which included posts or studs of the character mentioned also included eyeglass guards connected to the inner ends of said posts or studs and bow springs the opposite ends of which were and also are connected to the said posts or studs, usually in housings or seats at the inner ends of said posts or studs. In such structures the bow springs exert the pressure by means of which the eyeglasses are held in position.

My invention aims to provide a construction in which posts or studs which may or may not have housings at their inner ends may be employed in connection with eyeglass mountings including a bridge which is adapted to rest upon the nose and spring actuated arms or levers supporting guards at their rear ends, the said eyeglasses provided with such mountings being of the class and character usually designated as finger-piece eyeglasses.

Other objects and advantages of my construction will be referred to hereinafter in the detailed description of my invention or will be obvious therefrom.

My invention comprehends the combination and arrangement of parts illustrated in the drawings and described in the specification and also such other combinations and arrangements of parts as are within the scope of my invention as it is set forth in the claims.

In the drawings:—Figure 1 is a front view of a pair of eyeglasses which embodies my invention, a portion of the mounting being in section; Fig. 2 is a transverse section of the mounting through the housing of a part or stud and looking inwardly toward the spring and toward the end of the bridge connection extending between the posts or studs. Fig. 3 is a rear view of a portion of a lens and the portion of the mounting connected thereto; Fig. 4 is a view similar to Fig. 2 showing a slightly modified construction; Fig. 5 is a view of the rear side of a portion of an eyeglass lens and the mounting, partly in section, connected thereto showing a modified construction of housing, and Fig. 6 is a view of the rear side of a portion of an eyeglass lens and the mounting, partly in section, connected thereto showing still another modified construction of mounting.

Referring to the drawings: 1 designates the lenses and 2 the posts or studs connected thereto by means of straps 3 and having stays 4. The posts or studs as illustrated are provided with housings 5, although it will be understood that the housings are not essential to my invention.

6 designates a bridge the opposite side portions of which are secured in the housings 5 by means of screws 7. The posts or studs as illustrated are of substantially the same construction as those which are now in common use. The opposite ends of the bridge 6 are extended beyond the studs 2 and in the specific construction shown are provided with outwardly extended portions 9 upon which the guard supporting arms or levers 10 are pivoted by means of pivot screws 11.

It is to be understood that my invention is not limited to a bridge of the exact form and construction shown, nor is it limited to the exact manner of pivotally supporting the guard arms 10 which is illustrated; but more broadly considered it comprehends a construction including a combination of posts or studs secured to the lenses, a bridge or an equivalent device connected at its opposite ends in any known manner to the said posts or studs, and a pivoted arm or lever supporting at its rear ends nose bearing pieces which are adapted to rest upon the nose.

12 designates the nose bearing pieces or guards secured to the rear ends of the levers 10 in any known manner which may be desired. The forward ends of the levers are extended to form finger-pieces or arms 15 by means of which the arms or levers 10 may be actuated to move the nose bearing pieces or guards in and out for the purpose of placing a pair of eyeglasses upon and removing them from the nose of a wearer.

The arms or levers 10 are held in position to cause the nose bearing pieces or guards 12 to clamp the nose by means of springs 16 which in the construction shown are secured within the housings 5 between the bridge and the inner ends of the studs by means of the screws 7 which are employed for securing the opposite sides of the bridge 6 to the posts or studs. The position of the spring may be changed as desired. The springs may consist of any suitable material such as flat or round material but I preferably form them of wire bent or otherwise formed to such shape as may be desired. As illustrated, the respective springs are bent so as to form what may be termed a body portion which extends into a housing, which body portion is provided with a loop or eye 17 through which a screw 7 passes to securely hold the spring in position. In the construction illustrated, the front portions 18 of the springs extend upwardly a considerable distance above the top edges of the housings and then extend rearwardly as shown at 19 and then downwardly as shown at 20 to the arms or levers 10 to which they are connected by bending the wire around the said arms as indicated at 21. The rear portion of the spring extends upwardly as indicated at 22 to a point considerably below the part 19 and is then bent rearwardly as indicated at 23 and is connected to the downwardly extending portion 20 of the spring as shown. By this arrangement the spring action or strength of the spring is materially increased in a most convenient and satisfactory manner. It is to be understood, however, that my invention is not limited to a spring of any particular construction but it is intended to include and comprehend a structure embodying the combination of springs, posts or studs, whatever may be their construction, and pivoted arms or levers supporting nose bearing pieces or guards actuated by the said springs.

In Fig. 4 I have shown a construction which is identical with that shown in Figs. 1, 2 and 3 except that the downwardly extending portion 20 of the spring is not connected to the arm or lever 10 but merely contacts with it as is indicated at 24.

In Fig. 5 I have shown a construction which differs from that shown in Fig. 1 in the manner of the construction of the housings. In said Fig. 5 the stud 25 is provided with an enlargement or head 26 which is adapted to extend between the opposite sides of a cover or box-like member 27. A side or end portion of the bridge 6 extends between the sides of the cover or box-like member 27 and between the base of the latter and the inner end of the stud 25. The spring 28 shown in Fig. 5 is of the same construction as the spring shown in Figs. 1 to 3 inclusive, and it is located between the outer side of the bridge 6 and the inner end of the stud 25. The member 27 and the spring 28 are all secured in position by means of a screw 30. My invention also comprehends as an article of manufacture, a bridge or equivalent portion of an eyeglass mounting having arms or levers pivoted at its opposite ends and nose bearing pieces or guards connected to said arms or levers. Such a structure and springs of the character illustrated herein or their equivalents may be placed upon the market and sold as separate articles of manufacture, and may be substituted for the ordinary bow spring and guard in common use so as to convert such a pair of glasses into fingerpiece eyeglasses.

In Fig. 6 of the drawings, I have shown a modified construction of mounting, in which the bridge or other means for connecting and holding the lenses in proper relation to each other and the means for supporting the arms or levers to which the nose-bearing pieces or guards are secured consist of separate members. Such a construction is desirable for the reason that the arms or levers, the guards connected thereto, and the means for supporting the said arms or levers may be manufactured and sold as a separate article of manufacture, which is adapted to be substituted for guards of the usual construction which are employed in connection with eyeglasses provided with posts or studs to which the guards are connected in various known ways. Such a construction may be employed, for instance, in substitution for the guards employed in eyeglasses provided with a bow spring of any known construction. In said Fig. 6, 33 designates a bridge secured at its opposite ends to posts 34, as indicated, the said bridge terminating at said posts, as shown at 35. 36 designates nose bearing pieces or guards supported upon the rear ends of levers 37, pivoted at 38, upon members 39 having portions 40, which are connected to the posts or studs 34. 41 designates the springs which are adapted to contact with the levers 37 to cause pressure of the guards 36 in the manner hereinbefore described in connection with the other figures of this drawing. Screws 42 which extend into and have connection with the posts or studs 34, are employed for securing the opposite ends of the member 33, the members 39, and the springs 41, to the said posts or studs.

In the construction as shown in Fig. 6, the levers 37 are pivoted upon horizontal portions of the members 39, while the portions 40 of the said members 39 extend upwardly into a position to be connected to the posts or studs 34. It is understood, however, that the exact arrangement and configuration of the parts 39 may be varied without departing from my invention. For instance, the portions 40 may extend downwardly into position to be connected to the posts or studs, instead of upwardly as illustrated, and also may be located between the ends of the bridge 30 and the opposite ends of the posts or studs 34.

Having thus described my invention, I claim:—

1. In eyeglasses, the combination of the lenses, posts or studs connected to the lenses, a bridge having its opposite side portions connected to the said posts or studs and the opposite ends of the said bridge extending beyond the said posts or studs, arms or levers pivoted to the opposite ends of the said bridge, nose bearing pieces or guards connected to the rear ends of the said arms or levers, springs having connection with the posts or studs and contacting with the said arms or levers to actuate the same to cause the nose bearing pieces or guards to clamp the nose of a wearer.

2. In eyeglasses, the combination of the lenses, posts or studs connected thereto, a bridge having its opposite side portions connected to the said posts or studs, the opposite ends of the said bridge being extended beyond the said posts or studs and being bent outwardly, arms or levers pivoted upon the said outwardly bent ends of the said bridge, nose bearing pieces or guards secured upon the rear ends of the said arms or levers, and springs for actuating the said nose bearing pieces or guards to cause them to clamp the nose of a wearer.

3. In eyeglasses, the combination of the lenses, posts or studs having housings at their inner ends, a bridge having its opposite side portions seated in the said housings, means for connecting the said bridge to the said posts or studs, and the opposite ends of the said bridge extending beyond the said housings and thereafter being extended outwardly, arms or levers pivoted upon the outwardly extended ends of the said bridge, nose bearing pieces or guards secured upon the rear ends of the said arms or levers, and springs seated in the said housings between the said bridge and the posts or studs for actuating the said guards to cause them to clamp the nose of a wearer.

4. In eyeglasses, the combination of the lenses, posts or studs connected to the lenses, the said posts or studs having housings at their inner ends, a bridge having its opposite side portions located in the said housings and having its opposite end portions extended beyond the said housings and then outwardly, arms or levers pivoted upon the said outwardly extended ends, nose bearing pieces or guards secured upon the rear ends of the said arms or levers, springs located in the said housings between the inner ends of the said stud and the opposite side portions of the said bridge, the said springs having extensions which are adapted to contact with the said arms or levers to actuate the said nose bearing pieces or guards to cause them to clamp the nose of a wearer, and means for securing the said bridge and the said springs to the said studs.

5. In eye-glasses, the combination of lenses, posts connected thereto, means extending from post to post for connecting the said lenses, devices for connecting the said means to the said posts, nose bearing pieces, pivotally supported arms or levers for supporting the said nose bearing pieces, and springs for actuating the said arms or levers to cause the said nose bearing pieces to clamp the nose, the said springs being connected to the said devices at points intermediate their ends, and the portions of the said springs upon opposite sides of their points of connection to the said devices being extended in substantially parallel relation with respect to each other, and one of the said end portions being longer than the other and bent laterally, the said laterally bent portion being connected to the other opposite end portion of the said spring, and the said laterally bent portion being further extended and placed in contact with the said lever whereby both end portions of the spring upon opposite sides of the said devices operate to exert pressure upon the said levers.

6. In eyeglasses, the combination of lenses, posts connected thereto, means extending from post to post for connecting the said lenses to each other, devices for connecting the said means to the said posts, nose bearing pieces, pivotally supported arms or levers for supporting the said nose bearing pieces, and springs for actuating the said arms or levers to cause the said nose bearing pieces to grip the nose, the said springs respectively consisting of a spring wire bent to form a loop, the opposite end portions of said loop being connected to each other and the said loop portions of the springs being connected to the said devices and one of the end portions of each of the said springs being extended and connected to the said arms or levers.

7. In eyeglasses the combination of lenses, means for connecting said lenses to each other, nose bearing pieces, arms or levers pivotally supported at the opposite ends of the said means for supporting the said nose bearing pieces, and springs for actuating the said arms or levers to cause the said nose bearing pieces to grip the nose, the said springs respectively consisting of a spring wire bent to form a loop, the opposite end portions of said loop being connected to each other and the said springs also being supported at the oposite ends of the said
5 means and one of the end portions of each of the said springs being extended and connected to the said arms or levers.

In testimony that I claim the foregoing as my invention, I have hereunto signed my name this 31st day of October A. D. 1910.

DANIEL V. BROWN.

In the presence of—
 E. F. MEALEY,
 I. M. TARLETON.